US010026278B1

(12) United States Patent
Asaro et al.

(10) Patent No.: US 10,026,278 B1
(45) Date of Patent: Jul. 17, 2018

(54) OPTIMAL EVACUATION PLANS IN EMERGENCY SITUATIONS

(71) Applicant: International Business Machines Corporation, Armonk, NY (US)

(72) Inventors: Alessandra Asaro, Rome (IT); Giulia Carnevale, Rome (IT); Marco Gianfico, Sant'Antimo (IT); Roberto Ragusa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/407,614

(22) Filed: Jan. 17, 2017

(51) Int. Cl.
G08B 1/08 (2006.01)
G08B 7/06 (2006.01)
G08B 25/01 (2006.01)
G01C 21/20 (2006.01)

(52) U.S. Cl.
CPC ........... G08B 7/066 (2013.01); G01C 21/206 (2013.01); G08B 7/062 (2013.01); G08B 25/016 (2013.01)

(58) Field of Classification Search
CPC ...... G08B 7/066; G08B 7/062; G01C 21/206; G06Q 90/20; G06Q 90/205
USPC ................................... 340/539.13
See application file for complete search history.

(56) References Cited

U.S. PATENT DOCUMENTS

| 7,924,149 | B2 | 4/2011 | Mendelson | |
|---|---|---|---|---|
| 9,513,131 | B2* | 12/2016 | Klein | G01C 21/206 |
| 2004/0172277 | A1* | 9/2004 | Dione | G06Q 90/205 |
| | | | | 705/324 |
| 2005/0190053 | A1* | 9/2005 | Dione | G06Q 10/06 |
| | | | | 340/500 |
| 2010/0299116 | A1* | 11/2010 | Tomastik | G06K 9/00771 |
| | | | | 703/2 |
| 2011/0084830 | A1 | 4/2011 | Kang et al. | |
| 2012/0047083 | A1 | 2/2012 | Qiao et al. | |
| 2014/0222329 | A1 | 8/2014 | Frey | |
| 2015/0066353 | A1 | 3/2015 | Klein et al. | |
| 2017/0059343 | A1* | 3/2017 | Spinelli | G01C 21/3667 |
| 2017/0177755 | A1* | 6/2017 | Beloglazov | G08B 27/00 |

FOREIGN PATENT DOCUMENTS

| CN | 103035097 A | 4/2013 |
|---|---|---|
| EP | 2492859 A2 | 8/2012 |
| WO | 2010054794 A2 | 5/2010 |

OTHER PUBLICATIONS

Rahman et al. "Occupant Movement Tracking in High-Rise Building Evacuation Planning Using RFID Technology and SMS Gateway", 2012 Southeast Asian Netwerk of Ergonomics Societies Conference (SEANES); 2012.
Castano et al. "A ZigBee and RFID Hybrid System for People Monitoring and Helping inside Large Buildings", 2010 IEEE Symposium on Industrial Electronics and Applications; Oct. 2010.

* cited by examiner

*Primary Examiner* — John A Tweel, Jr.
(74) *Attorney, Agent, or Firm* — Brown & Michaels, PC; David Woycechowsky

(57) ABSTRACT

An evacuation system which maintains an active count of people in real time in a location, for example a building or other geographic area with defined boundaries and dynamically calculates the best path for a user or group of users to follow when an emergency situation occurs. The people in the location may be tracked by a user wearable RFID device and may classify the people based on specific needs or other criteria.

17 Claims, 8 Drawing Sheets

OPTIMAL EVACUATION PLANS IN EMERGENCY SITUATIONS

BACKGROUND

The present invention relates to determining evacuation plans for a location, and more specifically to determining optimal evacuation plans in emergency situations for multiple groups of user with different needs within a location.

Every building is provided a static emergency plan of evacuation that defines the shortest path to an emergency exit to follow in case of fire, earthquake or any other dangerous situation. In this case, every single second is important and can make the difference as many people may be exiting through the emergency exit regardless of their capabilities or groups of people that need to stay together.

SUMMARY

According to one embodiment of the present invention a method of determining an optimal evacuation plan in an emergency situation for users within a location is disclosed. The method comprising the steps of: a computer maintaining a count of a number of users categorized in groups and the positions of the users within the location in real time; the computer receiving input regarding an identification of an emergency situation within the location; the computer capturing a snapshot of positions of all of the users within the location; the computer simulating all evacuation routes within the location to exits for all users; the computer assigning a score to the simulated evacuation routes within the location for each user based on the group of each user and the position of each user within the location; and the computer implementing the evacuation route with a greatest score for each of the users within the location.

According to another embodiment of the present invention, a computer program product for determining an optimal evacuation plan in an emergency situation for users within a location. The computer program product comprising a computer comprising at least one processor, one or more memories, one or more computer readable storage media, the computer program product comprising a computer readable storage medium having program instructions embodied therewith. The program instructions executable by the computer to perform a method comprising: maintaining, by the computer, a count of a number of users categorized in groups and the positions of the users within the location in real time; receiving, by the computer, input regarding an identification of an emergency situation within the location; capturing, by the computer, a snapshot of positions of all of the users within the location; simulating, by the computer, all evacuation routes within the location to exits for all users; assigning, by the computer, a score to the simulated evacuation routes within the location for each user based on the group of each user and the position of each user within the location; and implementing, by the computer, the evacuation route with a greatest score for each of the users within the location.

According to an embodiment of the present invention, a computer system for determining an optimal evacuation plan in an emergency situation for users within a location is disclosed. The computer system comprising a computer comprising at least one processor, one or more memories, one or more computer readable storage media having program instructions executable by the computer to perform the program instructions comprising: maintaining, by the computer, a count of a number of users categorized in groups and the positions of the users within the location in real time; receiving, by the computer, input regarding an identification of an emergency situation within the location; capturing, by the computer, a snapshot of positions of all of the users within the location; simulating, by the computer, all evacuation routes within the location to exits for all users; assigning, by the computer, a score to the simulated evacuation routes within the location for each user based on the group of each user and the position of each user within the location; and implementing, by the computer, the evacuation route with a greatest score for each of the users within the location.

DETAILED DESCRIPTION

In an embodiment of the present invention, an evacuation system maintains an active count of people in real time in a location, for example a building or other geographic area with defined boundaries and dynamically calculates the best path to follow when an emergency situation occurs. In certain embodiments, the evacuation system is aware of areas within the location with a greater density of people. The people in the location may be tracked by a user wearable RFID device and may classify the people based on specific needs or other criteria.

Figure 1:
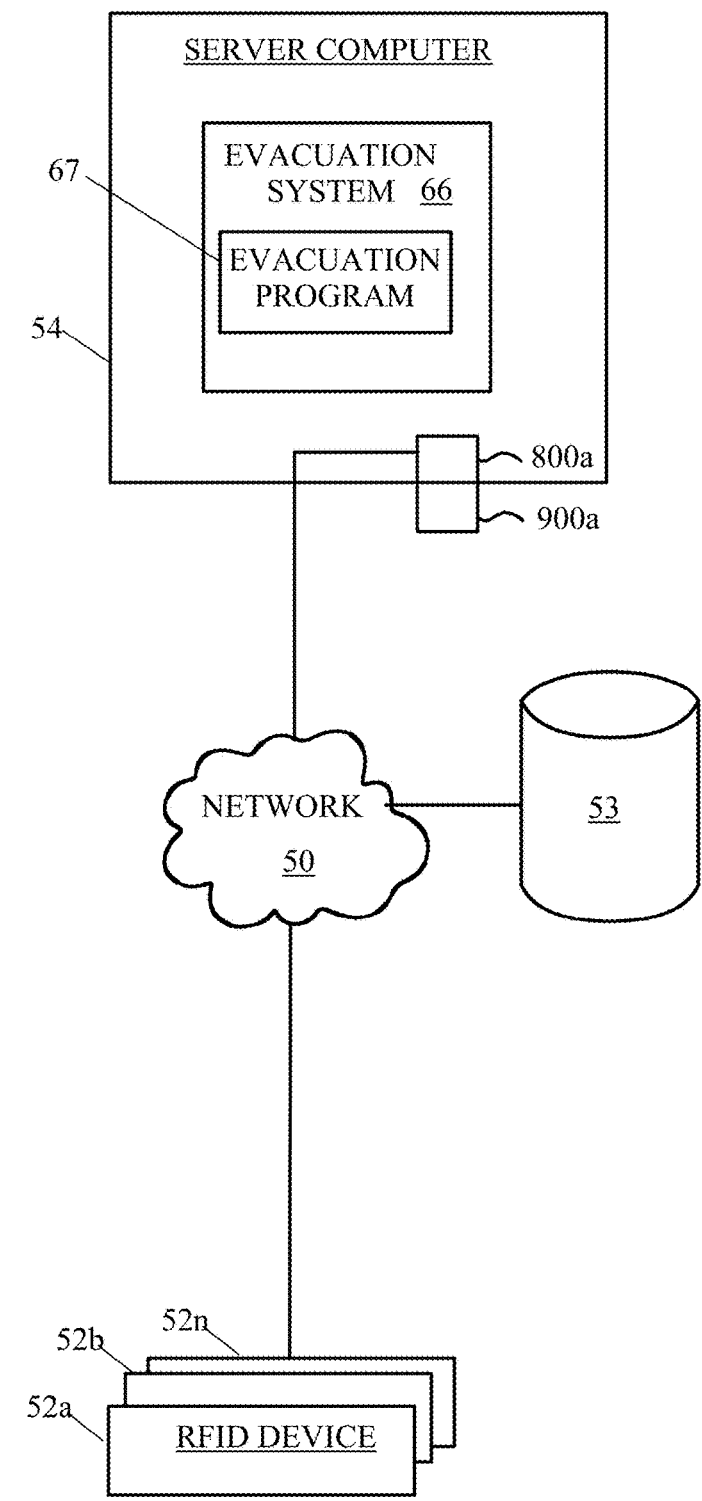
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, RFID devices 52a-52n, a repository 53, and a server computer 54 connect to network 50. In other exemplary embodiments, network data processing system 51 may include additional device computers, storage devices or repositories, server computers, and other devices not shown.

Radio-frequency identification (RFID) devices 52a-52n such as a device containing a tag or label may be connected to the server computer 54 through the network 50. RFID tags can be passive, active, or battery-assisted passive. An active tag has an on-board battery and periodically transmits an identification (ID) signal. A battery-assisted passive (BAP) tag has a small battery on board and is activated when in the presence of an RFID reader. A passive tag uses the radio energy transmitted by the reader.

RFID tags may include at least two parts: an integrated circuit for storing and processing information, modulating and demodulating a radio-frequency (RF) signal, collecting DC power from the incident reader signal, and other specialized functions; and an antenna for receiving and transmitting the signal. The tag information is stored in a non-volatile memory and may be transmitted to the reader or sensor to convey identification of a user wearing or carrying the tag. The RFID tag includes either fixed or programmable logic for processing the transmission and sensor data, respectively.

In an alternate embodiment, the RFID tags may be another portable transponder that can be queried for location of the transponder.

Figure 8:
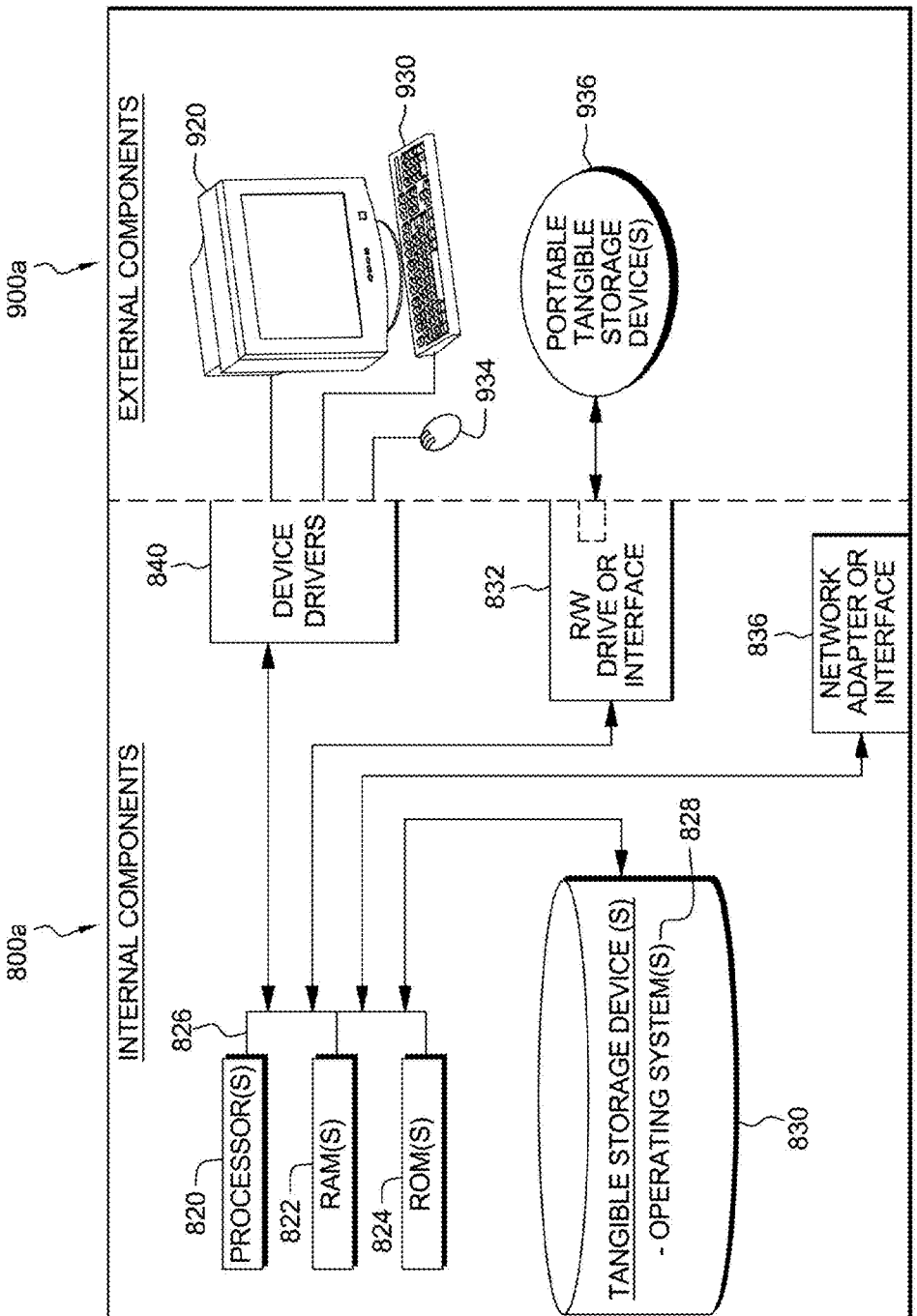
FIG. 8 illustrates internal and external components of a client computer and a server computer in which illustrative embodiments may be implemented.

Server computer 54 includes a set of internal components 800a and a set of external components 900a illustrated in FIG. 8. Server computer 54 can compute the information locally or extract the information from other computers on network 50. The server computer 54 preferably contains an evacuation system 66 with an evacuation program 67. The evacuation program 67 of the evacuation system 66 preferably controls two-way radio transmitter-receivers called interrogators or readers in the location which can send a signal to the tags 52a-52n and read its response. Multiple readers may be set up in the location and are preferably fixed readers to create a specific interrogation zone within the location.

Program code and programs such as evacuation program 67 may be stored on at least one of one or more computer-readable tangible storage devices 830 shown in FIG. 8, on at least one of one or more portable computer-readable tangible storage devices 936 as shown in FIG. 8, or on storage unit 53 connected to network 50, or may be downloaded to server computer 54, for use.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 3:
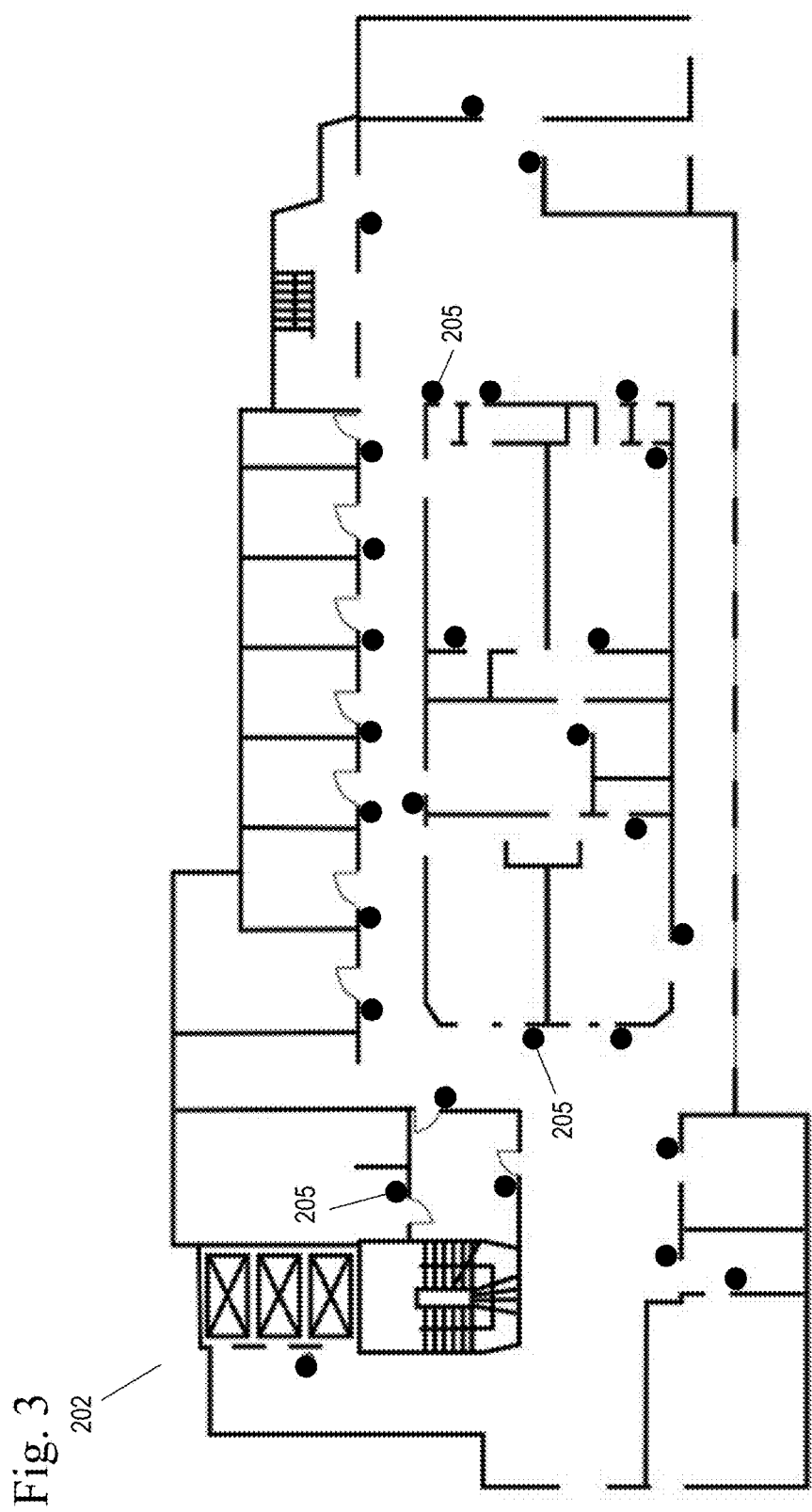
FIG. 3 shows a schematic of a floor plan of a location.

Prior to the method beginning, RFID tags 52a-52n are assigned to a plurality of users as users enter a location. One RFID tag may be provided to a group of users or individual users. Identification relating to the users may be associated with the RFID tags. In certain embodiments, the RFID tags 52a-52n may be associated with a classification or category assigned to the user. For example, certain RFID tags 52a-52n may be designated for users with hearing impairment or mobility issues or impairment. A location is a geographic area with defined boundaries, for example a building or venue comprised of multiple buildings or sites. Within the location, RFID sensors or readers (see 205 of FIG. 3) are present in fixed locations, such as doorways, floors, inside rooms, and/or next to exits. The evacuation system 66 stores the specific placement of the RFID sensors or readers 205.

Figure 2:
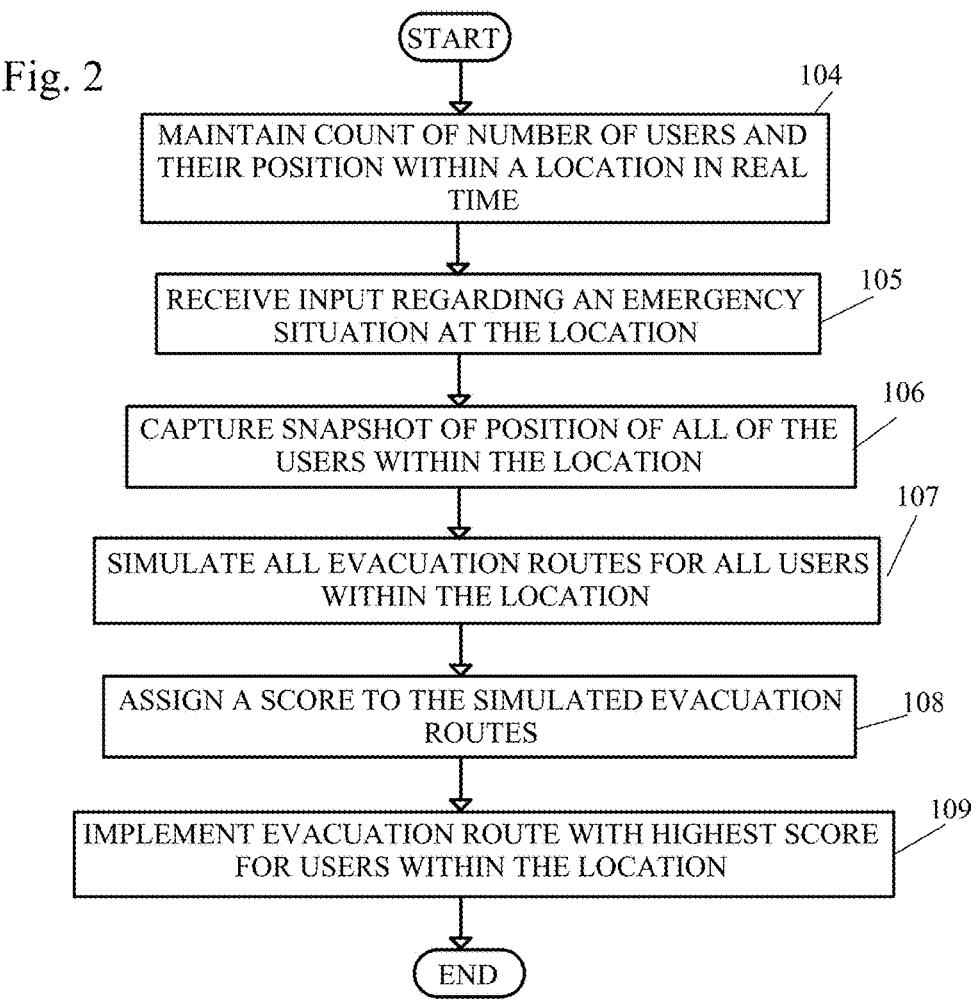
FIG. 2 shows a flow diagram of a method of determining an optimal evacuation plan in emergency situations.

FIG. 2 shows a flow diagram of a method of determining an optimal evacuation plan in an emergency situation for users within a location.

In a first step, the evacuation program 67 of the evacuation system 66 maintains a count in real time of the number of users and their position within a location based on RFID tag position (step 104). The count of the number of users and their position within a location continues until input regarding an emergency situation is received. In an alternate embodiment, the count of the number of users and their position within a location continues throughout the emergency situation.

The evacuation program 67 of the evacuation system 66 receives input regarding an emergency situation (step 105). The input may be detected by the evacuation system 66, may be provided by an outside or third party or may be identified by a user within the location.

The evacuation program 67 captures a snapshot of the position of all of the users within the location immediately after receiving input regarding the emergency situation (step 106). From identification of the RFID tags of the users, categorization of the users may also be determined.

The evacuation program 67 of the evacuation system 66 simulates all evacuation routes for all users within the location (step 107). The evacuation routes simulated are based on at least the capacity of the exits to be used during the emergency, condition of the exit during the emergency (useable or unusable), relation between the users and groups of users within the location which would include the number of users and their positions within the location as captured by the snapshot taken at approximately the time of the emergency situation, whether any exits can only be used by a certain group of users, rank of escapes for a single user. The evacuation route may additionally be based on the layout of the location. The evacuation routes may also be simulated while accounting for categories of a group of users present within the location. For example, simulating a first route for users which are mobility impaired and other routes for users with no impairments. Alternatively, a first evacuation route may be simulated and eventually recommended for a family with small children versus a second evacuation route simulated and eventually recommended for a group of adults. It should be noted that a same evacuation route may be chosen for multiple categories of users. The evacuation routes may be simulated using an iterative simulation algorithm. The iterative simulation algorithm can be executed on any relational structure where a value can be assigned to any condition above or other conditions.

The evacuation program 67 of the evacuation system 66 assigns a score to the simulated evacuation routes (step 108). The score is preferably based on the avoidance of dangerous areas and the amount of time needed for users to exit the location. For example, users who have mobility impairments may need longer to navigate a route than users without mobility impairments.

The evacuation program 67 implements the evacuation route with the highest score for the users within the location (step 109) and the method ends. The evacuation routes are dynamic and may be updated as the emergency situation evolves. The evacuation route may be implemented by sending specific directions to users and groups of users as appropriate to meet their needs.

The evacuation route may be different for different users and different categories or group of users. For example, a route with six flights of stairs may be chosen for users with no impairment, while a route using an elevator is chosen for those users with a mobility impairment (assuming that the elevator is safe to use). For example, even though a route with six flights of stairs may receive a higher general safety score than a route using an elevator, the route with six flight of stairs is chosen for users with no impairment and the route using the elevator is chosen for those users with a mobility impairment (assuming that the elevator is safe to use).

The location may implement the evacuation route by using colors associated with the RFID devices assigned to the users, display screens within the location, lighting within the location which may be in different colors, and/or colored exit signs or markings of exits.

FIGS. 3-7 shows an example of a location. A wearable transponder is given to each user entering the location 202 which includes a building. The wearable transponder preferably contains an RFID tag that defines a certain group of people, possibly with unusual characteristics or mobility needs. The wearable transponders may be of specific colors which correspond to a group. For example, the colors could be red for workers, green for external visitors, white for mobility impaired visitors and other colors assigned to the remaining users, while trying to assure an identical color for users who expect to stay together (e g family members).

Figure 5:
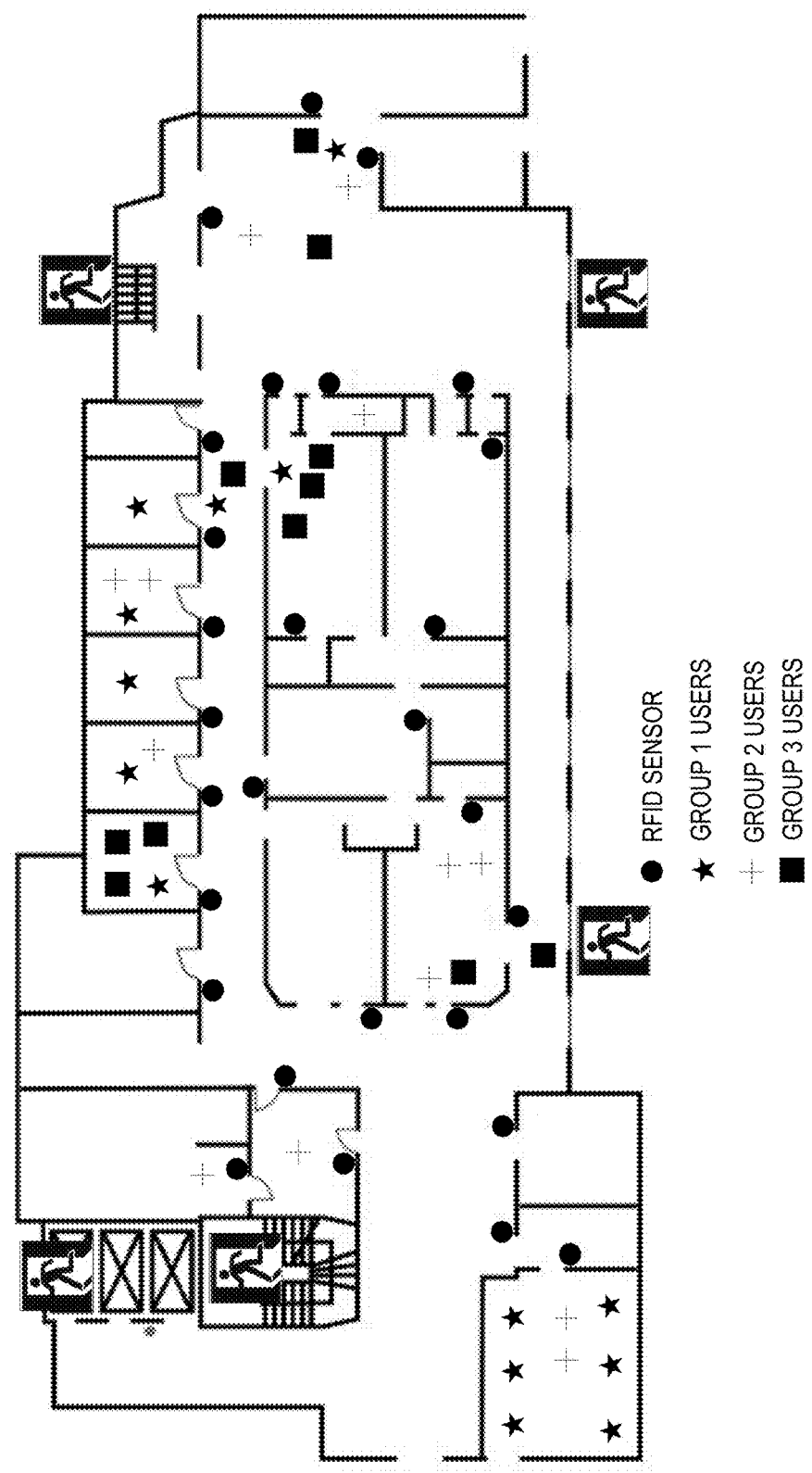
FIG. 5 shows a schematic of a floor plan of a location with positions of groups of users within the location.

A location with three different categories of users is shown in FIG. 5. Every group of people, identified by the color of the wearable transponder, can be assigned to a different exit path in case of emergency, depending on the considered population density of the area within the location.

Figure 4:
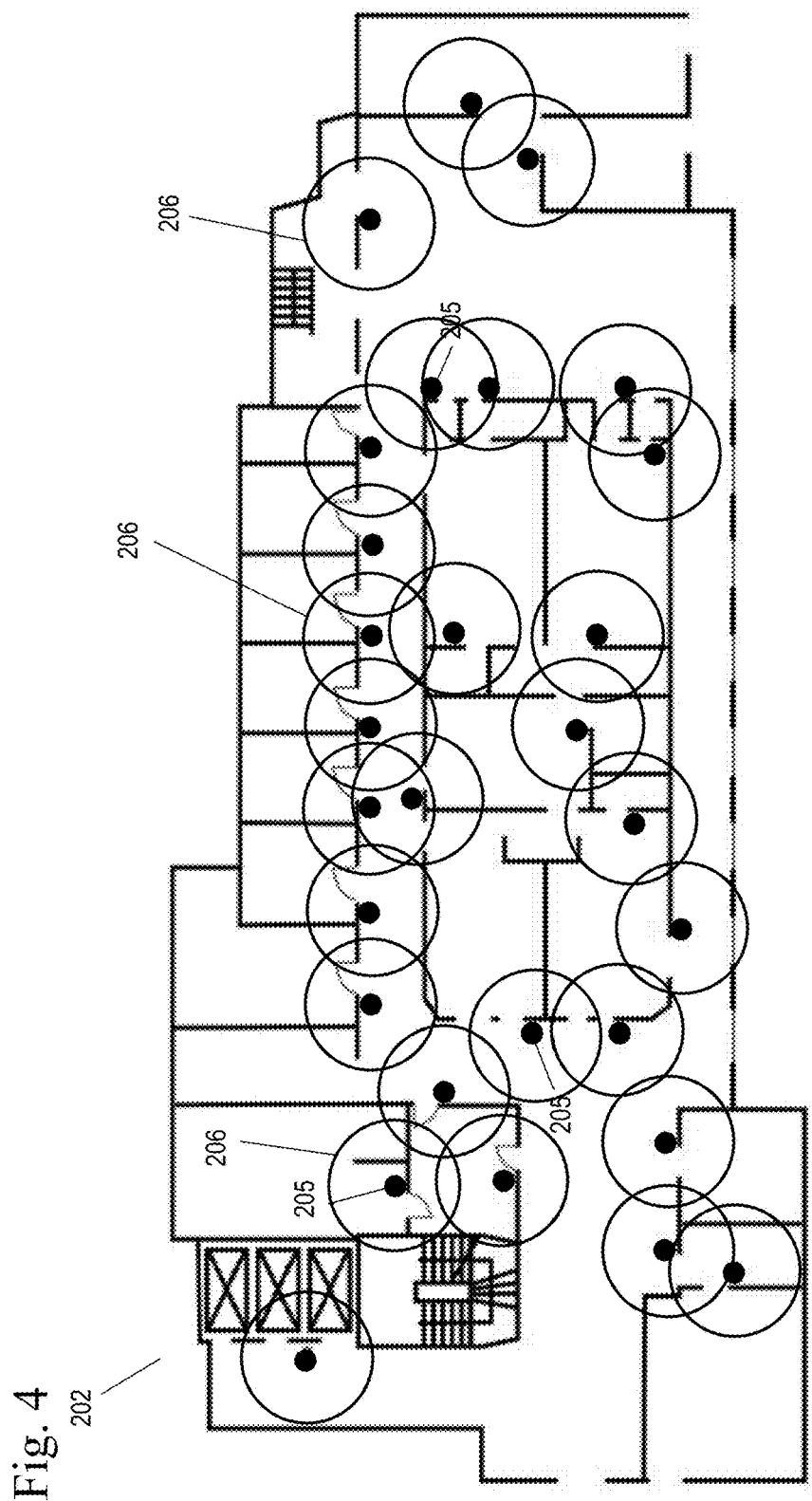
FIG. 4 shows a schematic of a floor plan of a location with the ranges of radio-frequency identification (RFID) sensors shown.

Each door in the location 202 is preferably provided an RFID sensor 205 (e. g. UHF RFID reader—shown as black dots throughout the floor plan of the location of FIG. 3) that notifies the evacuation system 66 about events in real time. Examples of placement of RFID sensors within a location and the associated range of detection of the location of RFID tags is shown in FIG. 4, with the range being indicated by the circles 206 surrounding the dots.

The RFID sensors 205 can detect a user in entry area, exiting from one area and entering into another one. The evacuation system registers these changes to constantly map user locations, which can be critical information during an emergency situation.

Whenever a person leaves the building, the wearable transponder and associated RFID tag is returned, so it may be reassigned to new visitors. The evacuation system 66 knows how many wearable transponders of each color corresponding to a specific group are already assigned to users within the location. The color of the transponder to give to the next user entering the location can in some cases be chosen so to keep the distribution of groups balanced. The evacuation system 66 maintains a count or counters for each category or group of users in each area of the location. An area may be defined as any place delimited by RFID sensors. A hallway and an elevator are two examples of an area.

For example, FIG. 5 shows three groups of users being tracked through wearable transponders. A first group of users is indicated by stars, a second group of users is indicated by plus signs and a third group is indicated by black boxes. The evacuation system 66 tracks the location of each user within the group.

The evacuation system 66 of the present invention determines the quickest path to an exit for each group, with the evacuation path determination beginning based on the current people locations in the building, their group (assigned color), and availability of transit and exit zones (e.g. currently flooded or on fire areas must be excluded from availability).

When an emergency situation occurs, the evacuation system captures a snapshot of the situation (e.g. position of users within areas of the location in real time), which is the input for repeatably evaluating different simulations of evacuation strategies/plans. A score is determined for each possible evacuation route. After a maximum predefined elaboration time, which is seconds, for example, the more effective plan is chosen as output, as it specifies the best hazard-free path to a safe exit for each group of users in each area of the location.

Figure 6:
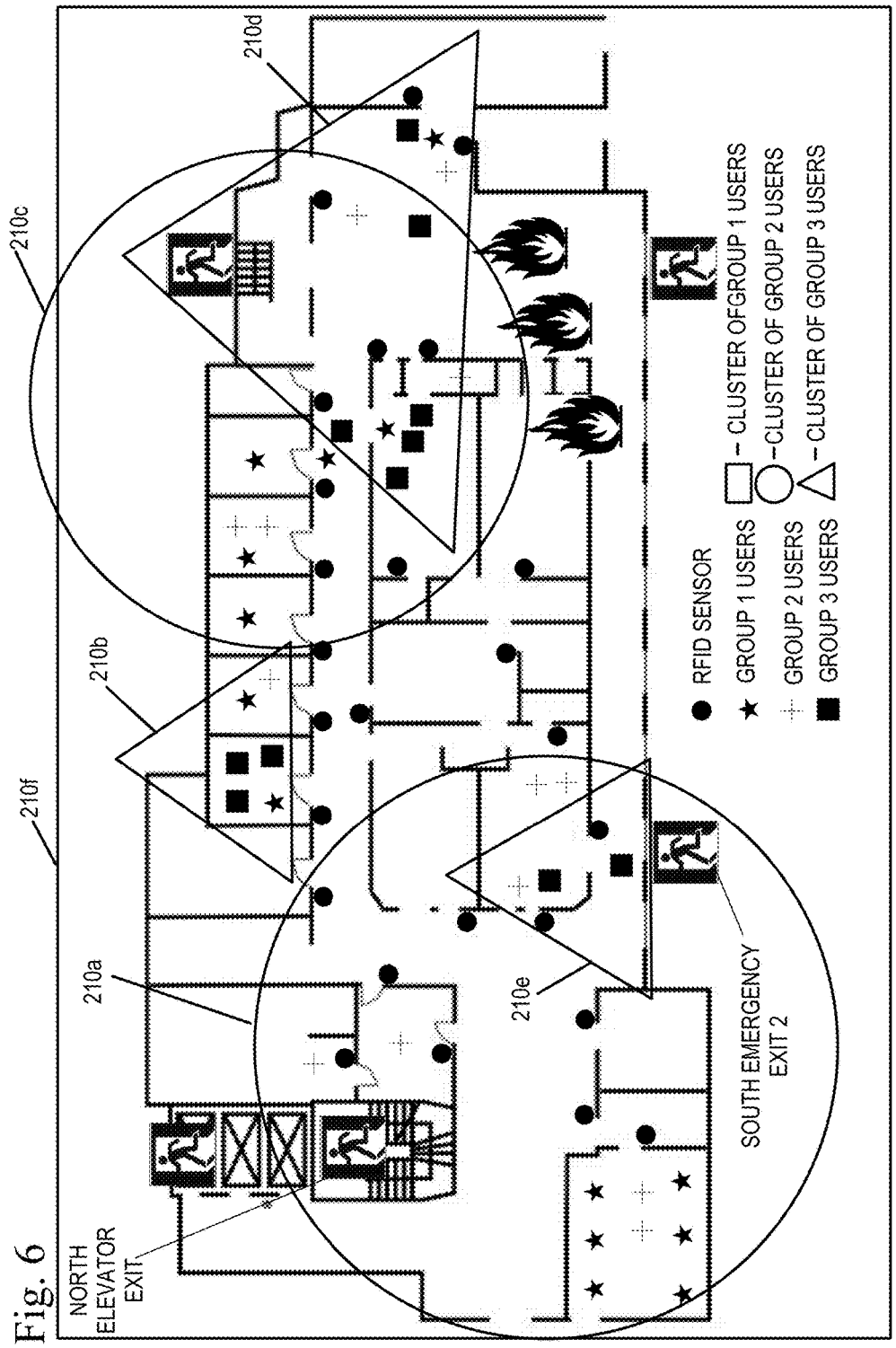
FIG. 6 shows a schematic of a floor plan of a location showing an emergency situation and clusters of users within the location relative to the emergency.

Referring to FIG. 6, when an emergency situation occurs (e.g. fire), the evacuation system 66 has a view of the distribution of users, since each user or group of users is assigned to the last RFID sensor 205 it was detected as being near. Users will be grouped depending on their color and the available nearby emergency exits, using an iterative simulation algorithm that simulates a few evacuation plans and identifies the plan with a higher score, related to evacuation time. The score may be calculated by considering the movement speed of different users, how many users are able to cross a door in a minute, how many users can fit in an elevator, etc.

Different shapes (e.g. large circle, square, and triangle—labeled as 210a-210f) in FIG. 6 are used to highlight clusters of color type and type of user. Note that the cluster of users in the area nearest the elevator is due to their only being one elevator present for users which may be mobility impaired. For example, the square 210f is a cluster of group 1 users, the triangles 210b, 210d, 210e are clusters of group 3 users and the circles 210a, 210c are clusters of group 2 users.

For example, using an iterative simulation algorithm,
Iteration 1:
  highest rank in the history=0
  group 2 users (+) in the 3° circle (210a) assigned to "south emergency exit 2—score 70"
  score of group 2 users: 40, lowest score of users 5, highest score of users 54. Group 2 users not impaired. Group 2 output→route 1
  group 1 users (stars) in the 1° square (210f) assigned to "north elevator exit—score 5"
  score of group 1 users: 24, lowest score of people (0), highest score of people (30).
  Group 1 users impaired. Group 1 output→route 2
  . . .
  General output→group of routes sum with value X
  X is higher than former highest rank→X assigned to highest rank
Iteration 2
  Highest rank in the history=X
  . . .

It should be noted that during an Iteration if there is an emergency in progress, the score of the emergency exit can change to let that exit be removed as advantageous for escape to the users (e.g. fire make an emergency exit score to 0).

Note that, in case of failing of the algorithm for safety/any reason (e.g. all emergency exits for impaired people are not usable, elevators are broken), the system drive the group affected to the safest area in the building they can reach, for example the one indicated by sensors to be safe (no fire, no smoke, next to an emergency exit that can be used by firefighters to enter).

Figure 7:
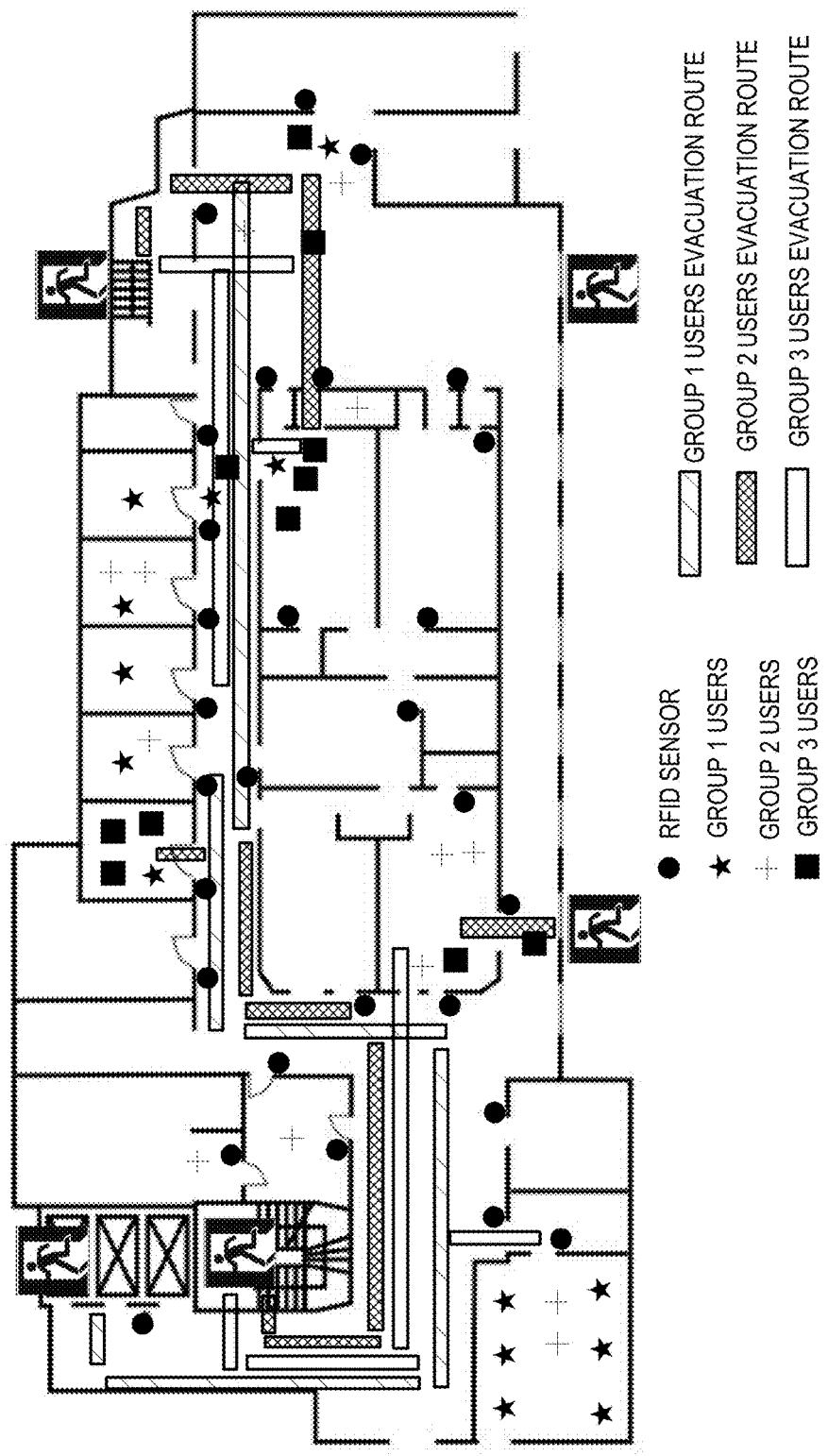
FIG. 7 shows a schematic of a floor plan of a location showing emergency evacuation routes for different groups of users within the location.

The location may use remote controlled light strips on the floors or walls of the location, colored light arrows that appear on panels within the location, media systems, colored exit signs and other visual or audio indicators to notify people about the emergency path to follow within the location as shown in FIG. 7. In FIG. 7, the evacuation route of the group 1 users is indicated by diagonal hatched boxes, the evacuation route of the group 2 users is indicated by cross hatched boxes, and the evacuation route of the group 3 users is indicated by boxes with black outlines.

The remote controlled light stripes on the floor or on the walls of the building may be able to change color depending on the group of users and their associated wearable transponders for which an exit path is being displayed. The light will guide people of each category through their path.

In certain embodiments, the RFID sensors operate during the emergency situation and the evacuation paths can be dynamically altered based on changing conditions. The system can be dynamic, so it is able to redefine or alter an escape route if the conditions in the location change. If an exit is no longer usable by the users, the score may be calculated as zero and the evacuation paths of the user recalculated to adjust during the emergency.

In certain embodiments, tracking of incoming people can be applied in an emergency and can be particularly useful to map the distribution of rescue personnel or firefighters. In this case, the RFID tag could be just embedded in rescuing equipment (e. g. a firefighter uniform) and assigned to a special class. For this class, an additional routing indication can guide them to areas where people are stuck or need assistance instead of towards the exit by using the latest snapshot of the location available. The people may be in a location in which the system was unable to calculate an emergency route (people trapped by fire). The path provided to rescue personnel may be a "reverse" path of one of the groups of the users or a user within the location used to escape the location.

The evacuation system 66 may declare that the emergency is closed if everyone with an RFID tag or wearable transponder that is not in the rescue personnel class escapes the location, and declares the emergency "complete" when the rescue personnel exit the location.

FIG. 8 illustrates internal and external components of a server computer 54 in which illustrative embodiments may be implemented. In FIG. 1, a server computer 54 includes respective sets of internal components 800a and external components 900a. Each of the sets of internal components 800a includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and evacuation program 67 are stored on one or more of the computer-readable tangible storage devices 830 for execution by one or more of the processors 820 via one or more of the RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a also includes a R/W drive or interface 832 to read from and write to one or more portable computer-readable tangible storage devices 936 such as a CD-ROM, DVD, memory stick, magnetic tape, magnetic disk, optical disk or semiconductor storage device. Evacuation program 67 can be stored on one or more of the portable computer-readable tangible storage devices 936, read via R/W drive or interface 832 and loaded into hard drive 830.

Each set of internal components 800a also includes a network adapter or interface 836 such as a TCP/IP adapter card. Evacuation program 67 can be downloaded to the server computer 54 from an external computer via a network (for example, the Internet, a local area network or other, wide area network) and network adapter or interface 836. From the network adapter or interface 836, evacuation program 67 is loaded into hard drive 830. Evacuation program 67 can be downloaded to the server computer 54 from an external computer via a network (for example, the Internet, a local area network or other, wide area network) and network adapter or interface 836. From the network adapter or interface 836, evacuation program 67 is loaded into hard drive 830. The network may comprise copper wires, optical fibers, wireless transmission, routers, firewalls, switches, gateway computers and/or edge servers.

Each of the sets of external components 900a includes a computer display monitor 920, a keyboard 930, and a computer mouse 934. Each of the sets of internal components 800a also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Evacuation program 67 can be written in various programming languages including low-level, high-level, object-oriented or non object-oriented languages. Alternatively, the functions of an evacuation program 67 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining an optimal evacuation plan in an emergency situation for users within a location comprising the steps of:
   a computer maintaining a count of a number of users categorized in groups and positions of the users, tracked through portable transponders, within the location in real time;
   the computer receiving input regarding an identification of an emergency situation within the location;
   the computer capturing a snapshot of positions of all of the users within the location via the portable transponders;
   the computer simulating all evacuation routes within the location to exits for all users;
   the computer assigning a score to the simulated evacuation routes within the location for each user based on: the group of each user and the position of each user within the location, capacity of the exits of the location to be used during the emergency, condition of the exits during the emergency, and whether the exits can only be used by a certain group of users; and
   the computer implementing the evacuation route with a greatest score for each of the users within the location through features of the location which are delineated for users based on their group.

2. The method of claim 1, wherein each user within a group receives an evacuation route.

3. The method of claim 1, wherein each group comprising a plurality of users receives an evacuation route.

4. The method of claim 1, wherein the grouping of users is based on at least one characteristic of the users.

5. The method of claim 1, wherein each group of users is delineated through color.

6. The method of claim 5, wherein the features of the location are selected from the group consisting of: display screens within the location, dynamically colored lighting within the location, colored exit signs, and colored markings of exits.

7. The method of claim 1, wherein when additional input regarding the emergency is received, the computer implementing an evacuation route with a greatest score for each of the users within the location based on the additional input regarding the emergency by the computer capturing another snapshot of positions of all of the users within the location; the computer simulating all evacuation routes within the location to exits for all users; and the computer reassigning a score to the simulated evacuation routes within the location for each user based on the group of each user and the position of each user within the location.

8. The method of claim 1, wherein at least some of the exits are unusable by users to exit the location.

9. A computer program product for determining an optimal evacuation plan in an emergency situation for users within a location, a computer comprising at least one processor, one or more memories, one or more computer readable storage media, the computer program product comprising a computer readable storage medium having program instructions embodied therewith, the program instructions executable by the computer to perform a method comprising:

maintaining, by the computer, a count of a number of users categorized in groups and positions of the users, tracked through portable transponders, within the location in real time;

receiving, by the computer, input regarding an identification of an emergency situation within the location;

capturing, by the computer, a snapshot of positions of all of the users within the location;

simulating, by the computer, all evacuation routes within the location to exits for all users;

assigning, by the computer, a score to the simulated evacuation routes within the location for each user based on: the group of each user and the position of each user within the location, capacity of the exits of the location to be used during the emergency, condition of the exits during the emergency, and whether the exits can only be used by a certain group of users; and implementing, by the computer, the evacuation route with a greatest score for each of the users within the location through features of the location which are delineated for users based on their group.

10. The computer program product of claim 9, wherein each user within a group receives an evacuation route.

11. The computer program product of claim 9, wherein each group comprising a plurality of users receives an evacuation route.

12. The computer program product of claim 9, wherein the grouping of users is based on at least one characteristic of the users.

13. A computer system for determining an optimal evacuation plan in an emergency situation for users within a location, the computer system comprising a computer comprising at least one processor, one or more memories, one or more computer readable storage media having program instructions executable by the computer to perform the program instructions comprising:

maintaining, by the computer, a count of a number of users categorized in groups and positions of the users, tracked through portable transponders, within the location in real time;

receiving, by the computer, input regarding an identification of an emergency situation within the location;

capturing, by the computer, a snapshot of positions of all of the users within the location;

simulating, by the computer, all evacuation routes within the location to exits for all users;

assigning, by the computer, a score to the simulated evacuation routes within the location for each user based on: the group of each user and the position of each user within the location, capacity of the exits of the location to be used during the emergency, condition of the exits during the emergency, and whether the exits can only be used by a certain group of users; and implementing, by the computer, the evacuation route with a greatest score for each of the users within the location through features of the location which are delineated for users based on their group.

14. The computer system of claim 13, wherein each user within a group receives an evacuation route.

15. The computer system of claim 13, wherein each group comprising a plurality of users receives an evacuation route.

16. The computer system of claim 13, wherein the grouping of users is based on at least one characteristic of the users.

17. The computer system of claim 13, wherein each group of users is delineated through color.

* * * * *